United States Patent
Lee et al.

(10) Patent No.: US 8,207,883 B2
(45) Date of Patent: Jun. 26, 2012

(54) PORTABLE TERMINAL AND METHOD FOR REMOTE CONTROL OF ELECTRONIC PRODUCTS

(75) Inventors: Jae-Ser Lee, Kumi-shi (KR); Soon-Jin Kim, Kumi-shi (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 592 days.

(21) Appl. No.: 10/681,107

(22) Filed: Oct. 9, 2003

(65) Prior Publication Data

US 2004/0257258 A1 Dec. 23, 2004

(30) Foreign Application Priority Data

Jun. 18, 2003 (KR) .................. 10-2003-0039421

(51) Int. Cl.
*H04L 13/00* (2006.01)
(52) U.S. Cl. ........ 341/176; 348/14.1; 345/169; 455/420
(58) Field of Classification Search .................... 367/83; 348/734, 552, 14.01; 345/173, 168, 169; 340/825.69, 176; 455/420, 419, 95, 92; 341/176
See application file for complete search history.

(56) References Cited

U.S. PATENT DOCUMENTS

| | | | |
|---|---|---|---|
| 5,671,267 A | 9/1997 | August et al. | |
| 5,943,625 A * | 8/1999 | Yeom et al. | 455/557 |
| 6,008,735 A * | 12/1999 | Chiloyan et al. | 340/825.22 |
| 6,061,435 A | 5/2000 | Grundvig et al. | |
| 6,223,029 B1 * | 4/2001 | Stenman et al. | 455/420 |
| 6,285,357 B1 | 9/2001 | Kushiro et al. | |
| 6,487,422 B1 | 11/2002 | Lee | |
| 6,765,557 B1 * | 7/2004 | Segal et al. | 345/173 |
| 7,151,954 B2 * | 12/2006 | Nagata | 455/567 |
| 7,746,994 B1 * | 6/2010 | Sanchez | 379/201.01 |
| 2002/0080273 A1 * | 6/2002 | Harrison et al. | 348/552 |
| 2003/0040334 A1 | 2/2003 | Lee | |
| 2005/0054337 A1 * | 3/2005 | Nobusawa et al. | 455/420 |
| 2005/0110651 A1 * | 5/2005 | Martis et al. | 340/825.69 |

FOREIGN PATENT DOCUMENTS

| | | |
|---|---|---|
| CN | 1334937 | 2/2002 |
| EP | 1 087 355 | 3/2001 |
| JP | 11-285071 | 10/1999 |
| JP | 2002-135810 A | 5/2002 |
| KR | 10-2001-0066204 A | 7/2001 |
| KR | 20-0258804 Y1 | 12/2001 |
| KR | 10 2002 0089637 A | 11/2002 |

* cited by examiner

*Primary Examiner* — Albert Wong
(74) *Attorney, Agent, or Firm* — Roylance, Abrams, Berdo & Goodman, L.L.P.

(57) ABSTRACT

Disclosed is a method for remote control of electronic products using a portable terminal. The portable terminal performs a remote control function in the remote control mode. When communication is tried during the remote control mode, the portable terminal terminates the remote control mode and displays the communication state to provide a communication service upon a user's selection. When the communication ends, the portable terminal returns to the remote control mode.

6 Claims, 6 Drawing Sheets

PORTABLE TERMINAL AND METHOD FOR REMOTE CONTROL OF ELECTRONIC PRODUCTS

PRIORITY

This application claims priority from Korean Patent Application Serial No. 2003-39421 entitled "Portable Terminal and Method for Remote Control of Electronic Products" filed in the Korean Intellectual Property Office on Jun. 18, 2003, the contents of which are hereby incorporated by reference in their entirety.

BACKGROUND OF THE INVENTION

1. Field of the Invention

The present invention relates to a portable terminal having a remote control function, and more particularly to a portable terminal having a remote control function and a method for remote control of electronic products using the portable terminal.

2. Description of the Related Art

As generally known in the art, a remote controller refers to a device for controlling an instrument or a machine from a distance. Many currently available electronic products are provided with a remote controller. A user can control various functions of an electronic product using a remote controller from a distance, without the need to directly operate the product. In most cases, however, different remote controllers are used to control different kinds of electronic products or the same kinds of electronic products of different manufacturers. In other words, the user can control only a single product using one remote controller. Different remote controllers should be used according to the kinds of electronic products, such as an audio system and a video system, and the manufacturers of the products. Accordingly, when a remote controller for a particular electronic product of a particular manufacturer has been lost, the user typically must purchase a new remote controller for the same product. Also, users can be inconvenienced when urgently seeking a lost remote controller for operating a particular electronic product.

SUMMARY OF THE INVENTION

Accordingly, the present invention has been made to solve the above-mentioned problems. One object of the present invention is to provide a portable terminal and a method for remote control of electronic products, regardless of the kinds or manufacturers of the products. Another object of the present invention is to provide a method for enabling communication during the remote control of electronic products using a portable terminal.

In order to accomplish the above objects, embodiments of the present invention provide a method for remote control of electronic products using a portable terminal, said method comprising the steps of performing a remote control of functions of the electronic products in a remote control mode; when communication is tried during the remote control mode, terminating the remote control mode and displaying the communication standby state to provide a communication service upon a user's selection; and when the communication ends, returning to the remote control mode.

In accordance with another aspect of the present invention, there is provided a method for performing a remote control in a remote control mode of a portable terminal, said method comprising the steps of displaying the kinds of electronic products controllable by a remote controller; displaying the manufacturers of the electronic products; selecting at least one kind of the displayed electronic products; selecting at least one of the displayed manufacturers; setting a remote control mode suitable for the selected electronic product of the selected manufacturer; performing a remote control function in the remote control mode; and terminating the remote control mode to terminate the remote control function.

In accordance with still another aspect of the present invention, there is provided a portable terminal for remote control of various functions of electronic products, which comprises a display section for displaying the kinds and manufacturers of electronic products controllable by a remote controller; a generalized programming input/output port for oscillating a remote control pulse according to a selected manufacturer; an infrared (IR) modulating/sending section for modulating the oscillated remote control pulse to an infrared ray and sending the infrared ray; and a control section for determining whether communication is tried during implementation of a remote control function, terminating the remote control function to implement a communication function when the communication is initiated, and performing the remote control function again when the communication ends.

BRIEF DESCRIPTION OF THE DRAWINGS

The above and other objects, features and advantages of the present invention will be more apparent from the following detailed description taken in conjunction with the accompanying drawing figures, in which.

DETAILED DESCRIPTION OF THE PREFERRED EMBODIMENT

Hereinafter, preferred embodiments of the present invention will be described with reference to the accompanying drawing figures. In the following description of embodiments of the present invention, a detailed description of known functions and configurations incorporated herein will be omitted when it may make the subject matter of the present invention rather unclear.

Figure 1:
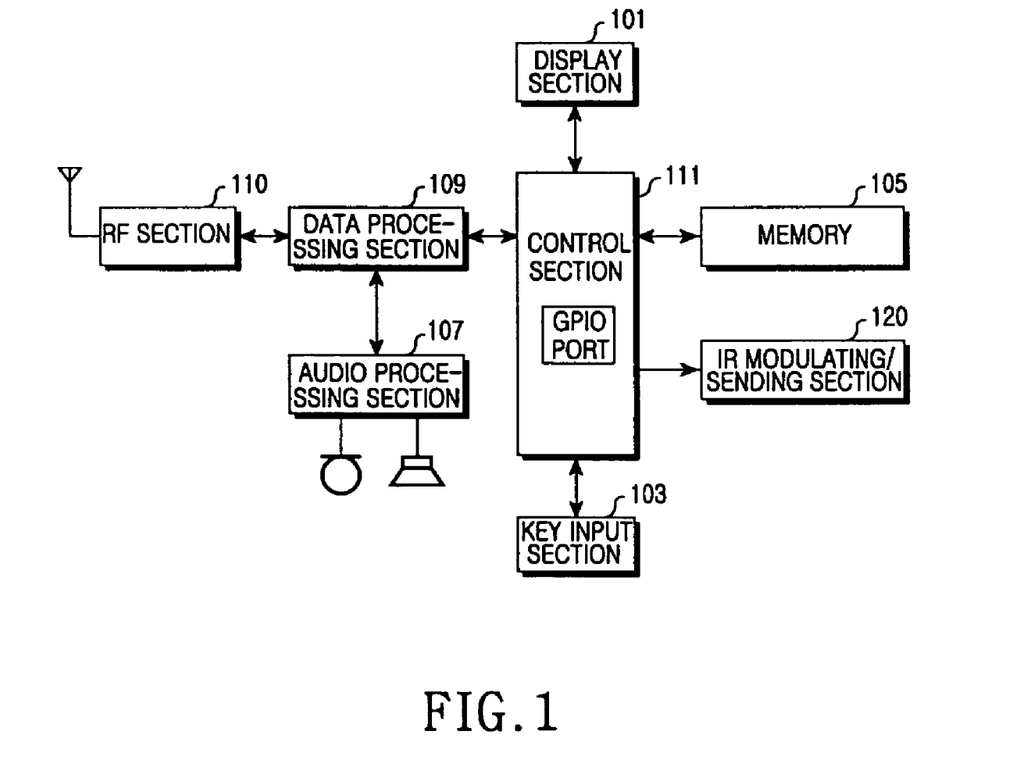
FIG. 1 is a block diagram of a portable terminal having a remote control function according to a first embodiment of the present invention.

FIG. 1 is a block diagram of a portable terminal having a remote control function according to the first embodiment of the present invention. Referring to FIG. 1, an RF section 110 performs a communication function of a portable terminal. The RF section 110 comprises an RF transmitter for performing upward conversion and amplification of the frequency of a signal, which is being transmitted, and an RF receiver for amplifying a signal, which is being received, with low noise and performing downward conversion of the frequency of the signal. A data processing section 109 comprises a transmitter for coding and modulating a signal which is being transmitted and a receiver for demodulating and decoding a signal which is being received. The data processing section 109 may be composed of a modem and a codec.

An audio processing section 107 reproduces an audio signal outputted from the data processing section 109 or transmits an audio signal generated from a microphone to the data processing section 109. A key input section 103 is provided with keys for inputting numbers and characters and function keys for setting up various functions. According to embodiments of the present invention, the functions keys may refer to a remote controller setting key, a product setting key, a product selection key, a manufacturer setting key, a manufacturer selection key, an OK key, a cancel key and so on. The functions keys may include a navigation key for moving a cursor on the display, a selection key, an OK key for confirmation, a cancel key for cancellation, and so on. As will be appreciated by those of ordinary skill in the art, it is possible to implement a particular function by pressing a combination of two or more function keys.

A memory 105 may be composed of a program memory and a data memory. The program memory includes programs for controlling general operations of the portable terminal. The data memory stores information for performing a remote control function according to embodiments of the present invention. Also, the data memory can temporarily store data generated during implementation of the above programs.

A control section 111 controls the overall operation of the portable terminal. As will be understood by those of ordinary skill in the art, the control section 111 may optionally include the data processing section 109. The control section 111 may also include a generalized programming input/output port ("GPIO port"). The GPIO port generates a frequency, for example, in the range of 30 KHz to 60 KHz. When provided outside of the control section 111, the GPIO port can be connected to an inside element of the portable terminal. The GPIO port oscillates a remote control pulse suitable for the selected kind and manufacturer of electronic product in accordance with a key signal inputted from the key input section 103. An IR modulating/sending section 120 modulates the remote control pulse oscillated by the GPIO port to an infrared ray and transmits the infrared ray from the portable terminal (preferably to the electronic product to be remote-controlled). The process of modulating a remote control pulse to an infrared ray can be performed at the control section 111. A display section 101, which may comprises a liquid crystal display (LCD), displays information relating to the remote control mode under the control of the control section 111.

Figure 2:
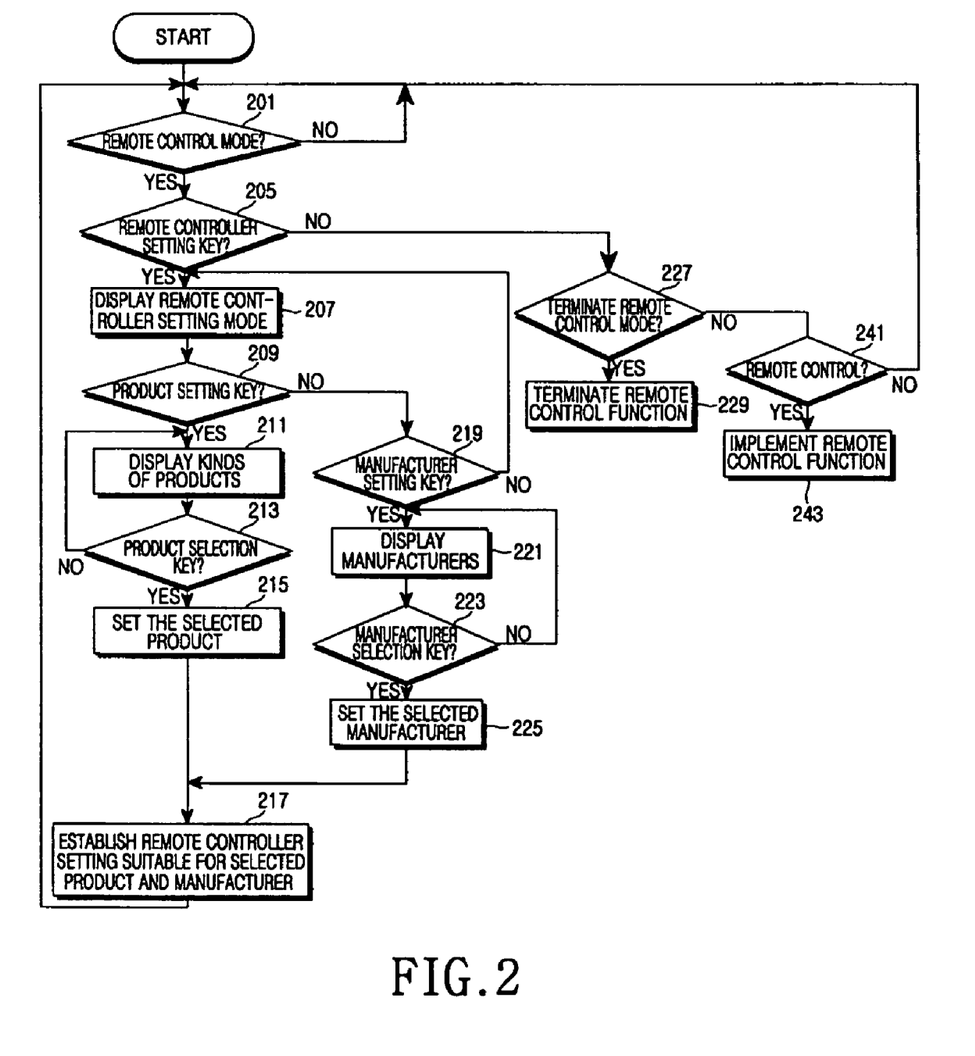
FIG. 2 is a flow chart showing a process of performing a remote control function in a portable terminal according to the first embodiment of the present invention.
Figure 3:
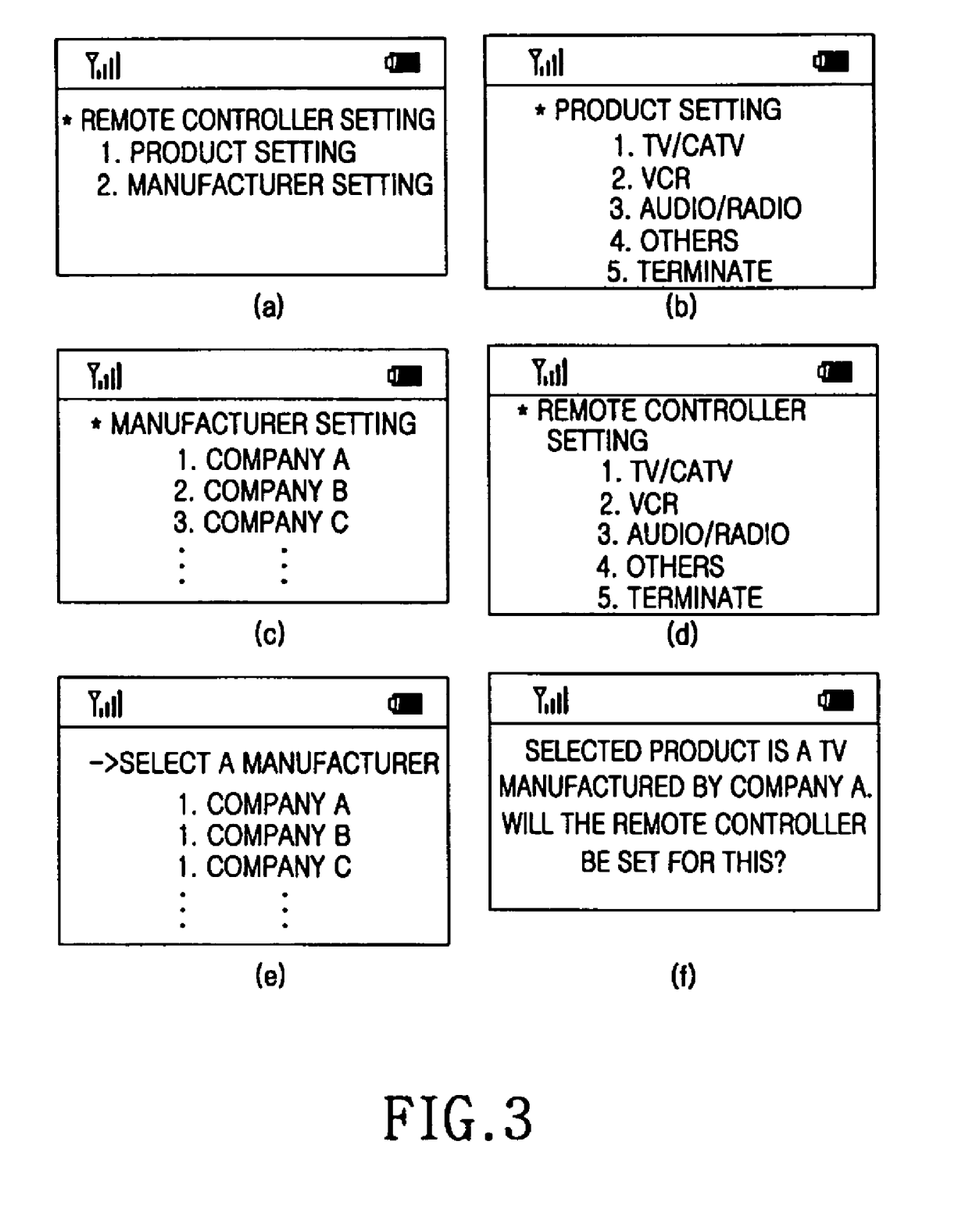
FIG. 3 shows the information displayed on a display section of a portable terminal according to the first embodiment of the present invention.
Figure 6:
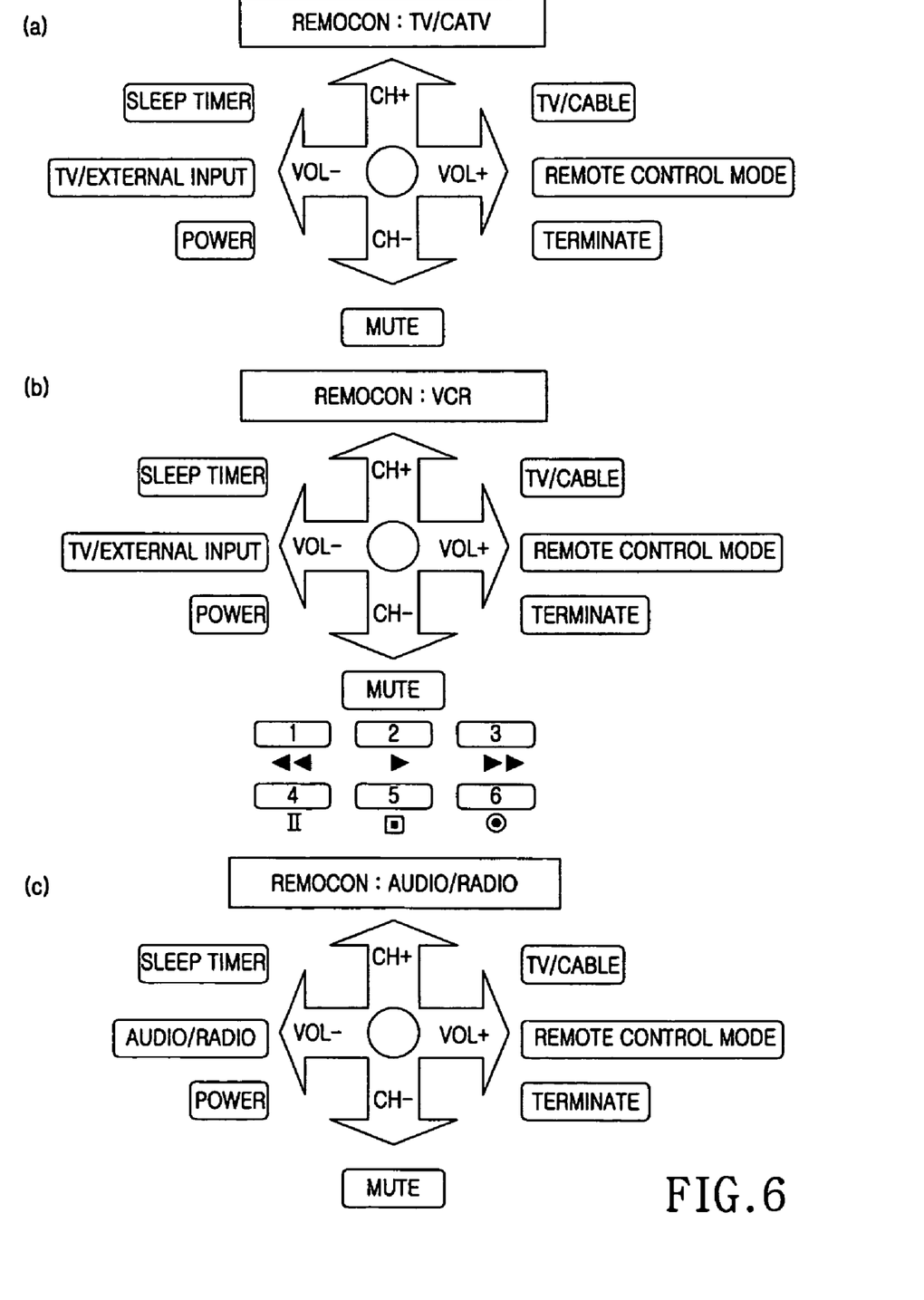
FIG. 6 shows the function of a key input section of a portable terminal according to the first embodiment of the present invention.

FIG. 2 is a flow chart showing a process of performing a remote control function in a portable terminal according to the first embodiment of the present invention. FIG. 3 shows the information displayed on a display section of a portable terminal according to the first embodiment of the present invention. FIG. 6 shows the function of a key input section of a portable terminal according to the first embodiment of the present invention. Hereinafter, the remote control mode and function according to embodiments of the present invention will be explained with reference to FIGS. 1, 2, 3 and 6.

At step 201, the control section 111 determines whether the portable terminal is in a remote control mode. If the portable terminal is in the remote control mode, the control section 111 will proceed with step 205. Otherwise, the control section 111 will maintain the initial state of the portable terminal. The remote control mode is a mode for implementing functions required for remote control, for example, a remote controller setting suitable for a selected electronic product of a selected manufacturer, a remote control implementation and a remote control termination.

At step 205, the control section 111 determines whether a key signal is inputted from the key input section 103. If a key signal for setting the remote controller is inputted, the control section 111 will proceed with step 207. Otherwise, the control section 111 will proceed with step 227. At step 207, the control section 111 converts the portable terminal to a remote controller setting mode and controls the display section 101 to display the remote controller setting mode. The display section 101 can display the remote controller setting mode as shown in FIG. 3(a).

At step 209, the control section 111 determines whether a key signal is inputted from the key input section 103. If a key signal for product setting is inputted, the control section 111 will proceed with step 211. Otherwise, the control section 111 will proceed with step 219. At step 211, the control section 111 controls the display section 103 to display the kinds of electronic products controllable by a remote controller and proceeds with step 213. As shown in FIG. 3(b), the display section 103 can display various kinds of electronic products, including televisions (TV), cable televisions (CATV), video cassette recorders (VCR), audio systems, radios and others which can be any kind of electronic products controllable by a remote controller, including air conditioners and refrigerators.

At step 213, the control section 111 determines whether a key signal is inputted from the key input section 103. If a key signal for product selection is inputted, the control section will set a kind of electronic product as selected by the user at step 215 and will proceed with step 217. Otherwise, the control section will repeat step 211.

At step 219, the control section 111 determines whether a key signal is inputted from the key input section 103. If a key signal for setting the manufacturer is inputted, the control section 111 will control the display section 101 to display the manufacturers at step 221 and will proceed with step 223. The display section 101 can display the manufacturers as shown in FIG. 3(c). If no key signal for manufacturer setting is inputted, the control section 111 will repeat step 207.

At step 223, the control section 111 determines whether a key signal is inputted from the key input section 103. If a key signal for manufacturer selection is inputted, the control section will set a manufacturer as selected by the user at step 225 and will proceed with step 217. Otherwise, the control section 111 will repeat step 221.

At step 217, the control section 111 establishes a remote controller setting suitable for the selected electronic product of the selected manufacturer and repeats step 201. Generally, a remote controller controls an electronic product from a distance by generating a signal. For the remote control, the remote controller uses a frequency and a remote control pulse, both varying depending on the kinds and manufacturers of electronic products. Accordingly, a suitable remote controller setting means a suitable remote control mode which conforms to the properties of a selected electronic product of a selected manufacturer.

At step 227, the control section 111 determines whether the remote control mode has been terminated. If so, the control section 111 will proceed with step 229 to terminate the remote control function for operating a remote controller. If the remote control mode is maintained, the control section 111 will proceed with step 241. At step 241, the control section 111 determines whether the user still uses the remote control function. If so, the control section 111 will proceed with step 243 to implement a function according to the established remote controller setting. Otherwise, the control section 111 will repeat step 201.

In the process of implementing a function according to the established remote controller setting, the control section 111 receives a key signal from the key input section 103. The preferred structure of the key input section 103 can be displayed as shown in FIG. 6(a), 6(b) or 6(c). Referring to FIG. 6, the remote controller setting varies depending on the kinds of electronic products, such as a TV/CATV, a VCR and an audio/radio. For example, the user can use the navigation key for selecting a channel and adjusting a volume in a VCR as shown in FIG. 6(b). Also, the number keys can be pressed to operate the VCR. For example, number keys 1, 2, 3, 4, 5 and 6 can be used to perform rewind, play, fast-forward, pause and record functions, respectively. The control section 111 generates a frequency (for example, 30 to 60 KHz) and a remote control pulse using the GPIO port and transfers them to the IR modulating/sending section 120. The frequency and the remote control pulse may vary depending on the kinds and manufacturers of electronic products. Also, the control section 111 controls the IR modulating/sending section 120 to generate an infrared wavelength based on the frequency and the remote control pulse. The infrared wavelength is outputted to the electronic products of the selected manufacturer. For example, the infrared wavelength can be 940 nm. The electronic products of the manufacturer selected at the remote controller setting operate upon receiving the infrared wavelength.

Figure 4:
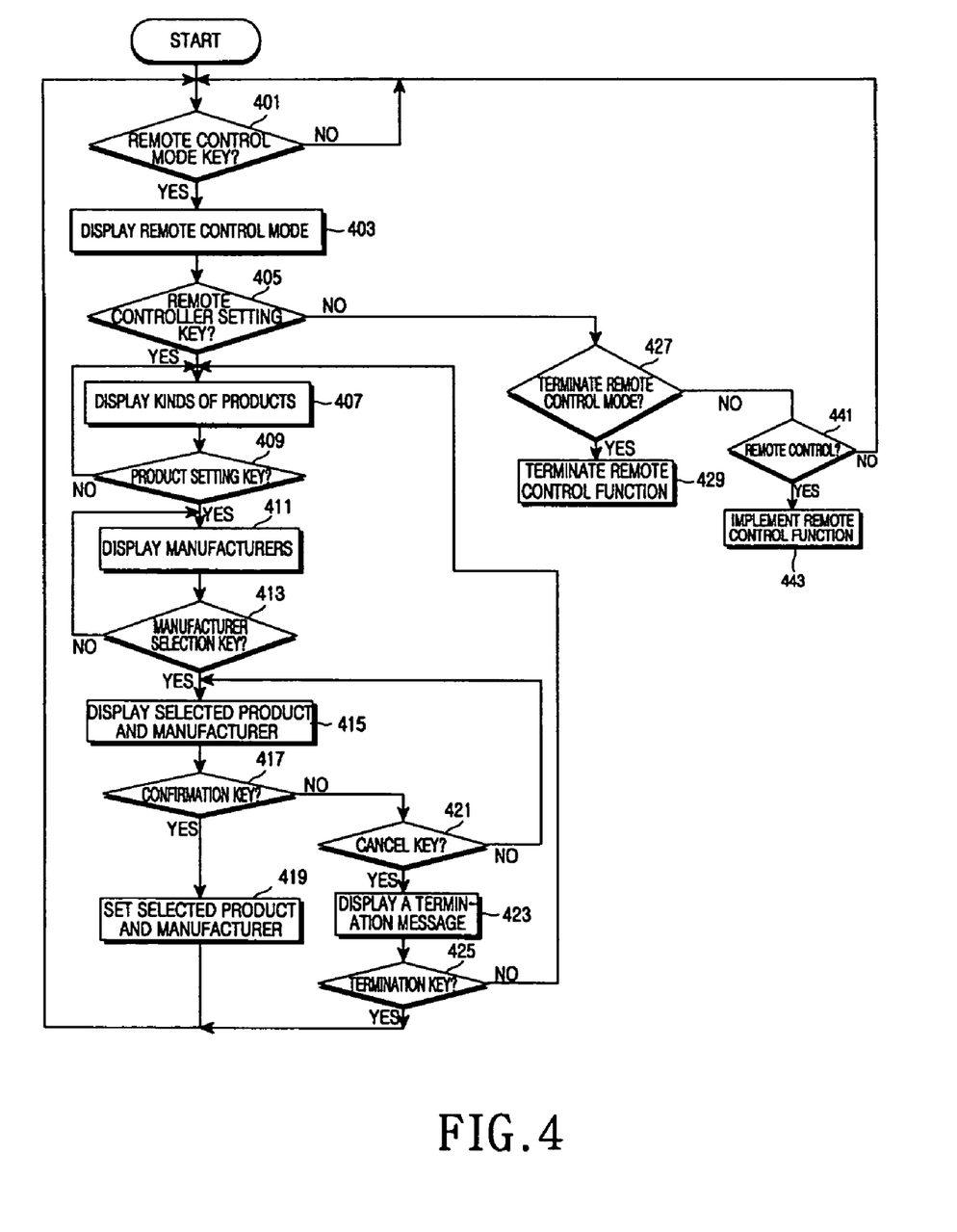
FIG. 4 is a flow chart showing a process of performing a remote control function in a portable terminal according to a second embodiment of the present invention.

FIG. 4 is a flow chart showing a process of performing a remote control function in a portable terminal according to a second embodiment of the present invention. Hereinafter, the remote control mode and function according to the second embodiment of the present invention will be explained with reference to FIGS. 1, 3 and 4.

At step 401, the control section 111 determines whether the portable terminal is in the remote control mode. If the portable terminal is in the remote control mode, the control section 111 will proceed with step 405. Otherwise, the control section 111 will maintain the initial state of the portable terminal. The remote control mode is a mode for implementing functions required for remote control, for example, a remote controller setting suitable for a selected electronic product of a selected manufacturer, a remote control implementation and a remote control termination.

At step 403, the display section 101 is controlled to display a remote control mode. Next, step 405 is implemented.

At step 405, the control section 111 determines whether a key signal is inputted from the key input section 103. If a key signal for remote controller setting is inputted, the control section 111 will proceed with step 407. Otherwise, the control section 111 will proceed with step 427. At step 407, the control section 111 controls the display section 101 to display the kinds of electronic products controllable by a remote controller and proceeds with step 409. The display section 103 can display the kinds of electronic products as shown in FIG. 3(d).

At step 409, the control section 111 determines whether a key signal is inputted from the key input section 103. If a key signal for product selection is inputted, the control section will proceed with step 411. Otherwise, the control section will repeat step 407. At step 411, the control section 111 controls the display section 101 to display the manufacturers and proceeds with step 413. The display section 101 can display the manufacturers as shown in FIG. 3(e).

At step 413, the control section 111 determines whether a key signal is inputted from the key input section 103. If a key signal for manufacturer selection is inputted, the control section will proceed with step 415. Otherwise, the control section 111 will repeat step 411. The control section 111 controls the display section 101 to display the selected product and manufacturer at step 415 and proceeds with step 417. For example, when the user wishes to use the remote control function of the portable terminal to watch TV, he or she should select first "TV" from the displayed kinds of electronic products and then the manufacturer of the TV to be remote controlled.

At step 417, the control section 111 determines whether a key signal is inputted from the key input section 103. If a key signal for confirmation is inputted, the control section 111 will proceed with step 419. Otherwise, the control section 111 will proceed with step 421. The control section 111 sets a remote control condition suitable for the selected electronic product of the selected manufacturer at step 419 and repeats step 401. To be specific, when a particular kind of electronic product is selected among a plurality of electronic products controllable by a remote controller and then a manufacturer of the selected electronic product is selected, the control section 111 sets a remote control condition which conforms to the properties of the selected electronic product of the selected manufacturer. More specifically, a frequency, a remote control pulse and so on are set to conform to the properties of the selected electronic product of the selected manufacturer.

At step 421, the control section 111 determines whether a key signal is inputted from the key input section 103. If a key signal for cancellation is inputted, the control section 111 will proceed with step 423. Otherwise, the control section 111 will repeat step 415. Also, if no key signal for cancellation or confirmation is inputted during a predetermined period of time, for example, within a minute, the control section 111 will terminate the remote control mode. At step 423, the control section 111 controls the display section 101 to display a message informing termination of the remote control mode and proceeds with step 425.

At step 425, the control section 111 determines whether a key signal is inputted from the key input section 103. If a key signal for termination is inputted, the control section 111 will repeat step 401 to allow the user to select another kind or manufacturer of electronic products. If no key signal for termination is inputted, the control section 111 will repeat step 407.

At step 427, the control section 111 determines whether the remote control mode has been terminated. If the remote control mode has been terminated, the control section 111 will proceed with step 429 to stop the remote control function for operating a remote controller. Otherwise, the control section 111 will proceed with step 441. At step 441, the control section 111 determines whether the user still uses the remote control function. If not, the control section 111 will repeat step 401. If the remote control function is still used, the control section 111 will proceed with step 443 to implement a function according to the established remote controller setting, which is similar to step 243 in the process shown in FIG. 2.

Figure 5:
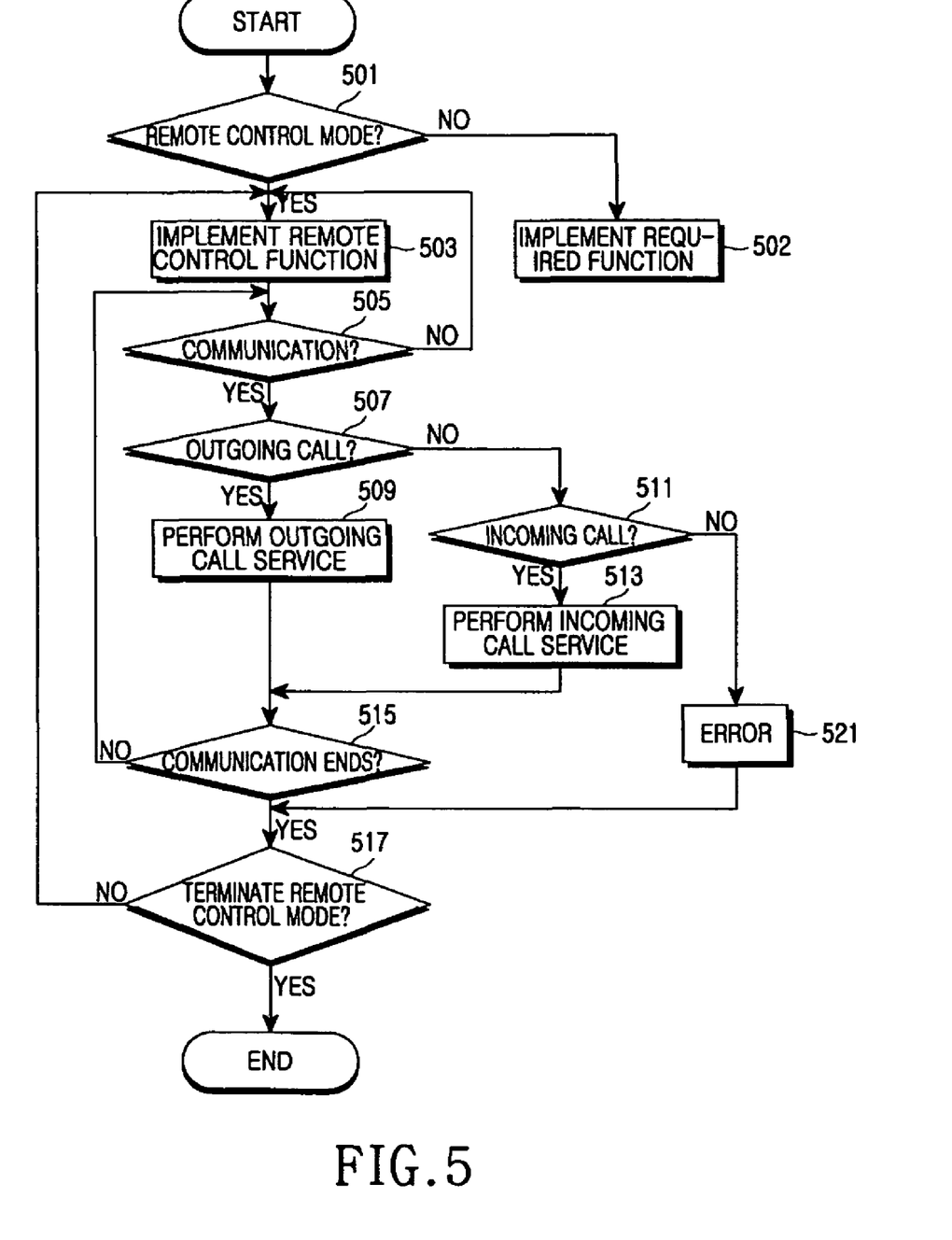
FIG. 5 is a flow chart showing the operation of a control section of a portable terminal to perform a communication function during a remote control mode according to the first embodiment of the present invention.

FIG. 5 is a flow chart showing the operation of a control section of a portable terminal to perform a communication function during the remote control mode according to the first embodiment of the present invention. The operation of the control section 111 will be described in detail with reference to FIGS. 1 and 5.

At step 501, the control section 111 determines whether the portable terminal is in a remote control mode. If the portable terminal is in the remote control mode, the control section 111 will proceed with step 503. Otherwise, the control section 111 will proceed with step 502 to implement a required function other than the remote control function. For example, the required function may relate to a voice communication, a text message service and a short message service. At step 503, the control section 111 implements the remote control function. The remote control mode is an operation mode of the portable terminal. The control section 111 can perform operations in the remote control mode as shown in FIG. 2 or FIG. 4.

At step 505, the control section 111 determines whether communication is initiated during the remote control mode. If communication is initiated, the control section 111 will terminate the remote control function and will proceed with step 507. Otherwise, the control section 111 will repeat step 503 to implement the remote control function. Although termination of the remote control function to initiate communication is described herein, it will be understood that the remote control function can be terminated to implement any other function. At step 507, the control section 111 determines whether the communication relates to an outgoing call. If so, the control section 111 will proceed with step 509 to perform an outgoing call service. If not, the control section 111 will proceed with step 511. A communication relating to an outgoing call, which means a call initiated by the user, refers to making a call or sending a text or voice message. Also, the outgoing call service refers to a service for performing communication relating to an outgoing call. At step 511, the control section 111 determines whether the communication relates to an incoming call. If so, the control section 111 will perform an incoming call service at step 513 and will proceed with step 515. A communication relating to an incoming call refers to answering a call or receiving a text or voice message. If the communication does not relate to an incoming call, the control section 111 will recognize the initiated communication as an error at step 521 and will proceed with step 517. An error is unexpected communication which is neither an outgoing call nor an incoming call.

At step 515, the control section 111 determines whether the communication ends. If so, the control section 111 will proceed with step 517. If not, the control section 111 will repeat step 505. At step 517, the control section 111 determines whether the remote control mode has been terminated. If so, the control section 111 will terminate the remote control function. If the remote control mode is maintained, the control section 111 will repeat step 503.

While the invention has been shown and described with reference to certain preferred embodiments thereof, it will be understood by those skilled in the art that various modifications, additions and substitutions may be made therein without departing from the spirit and scope of the invention as defined by the appended claims.

What is claimed is:

1. A method for remote control of electronic products using a portable terminal, which comprises the steps of:
    performing a remote control of functions of at least one electronic product in a remote control mode by controlling an infrared modulating/sending section to modulate an oscillated remote control pulse to an infrared ray and sending the infrared ray to the electronic products;
    when communication is tried during the remote control mode, determining whether the communication is an outgoing communication, and if the communication is an outgoing communication, switching from remote control mode to a communication mode and providing outgoing communication service at the portable terminal, and if the communication is not an outgoing communication, determining whether the communication is an incoming communication, and if the communication is an incoming communication, switching from remote control mode to a communication mode and providing incoming communication service at the portable terminal; and
    when the communication ends;
    returning to the remote control mode.

2. The method of claim 1, wherein performing a remote control of functions comprises:
    displaying kinds of electronic products controllable by a remote controller on a display of said portable terminal;
    when at least one kind of the displayed electronic products is selected, displaying the manufacturers of the selected electronic product on said display;
    when at least one of the displayed manufacturers is selected, displaying the selected electronic product and manufacturer and setting a remote control mode suitable for said selected electronic product;
    performing a remote control function in the remote control mode; and
    terminating the remote control mode to terminate the remote control function.

3. A method for remote control of electronic products using a portable terminal, which comprises the steps of:
    performing a remote control of functions of at least one electronic product in a remote control mode by controlling an infrared modulating/sending section to modulate an oscillated remote control pulse to an infrared ray and sending the infrared ray to the electronic product;
    when communication is tried during the remote control mode, determining whether the communication is an outgoing communication, and if the communication is an outgoing communication, switching from remote control mode to a communication mode and providing outgoing communication service at the portable terminal, and if the communication is not an outgoing communication, determining whether the communication is an incoming communication, and if the communication is an incoming communication, switching from remote control mode to a communication mode and providing incoming communication service at the portable terminal; and
    when the communication ends, returning to the remote control mode;
    wherein said step of returning to the remote control mode when communication ends comprises:
    determining whether the communication has ended;
    if the communication has ended, determining whether the remote control mode has been terminated; and
    if the remote control mode has not been terminated, implementing the remote control function again.

4. The method of claim 3, wherein performing a remote control of functions comprises:
    displaying kinds of electronic products controllable by a remote controller on a display of said portable terminal;
    displaying the manufacturers of the electronic products on said display;
    selecting at least one kind of the displayed electronic products and at least one of the displayed manufacturers;
    setting a remote control mode suitable for the selected electronic product of the selected manufacturer;
    performing a remote control function in the remote control mode; and
    terminating the remote control mode to terminate the remote control function.

5. A portable terminal for remote control of various functions of electronic products, which comprises:

a display section that displays the kinds and manufacturers of electronic products controllable by a remote controller;

a generalized programming input/output port that oscillates a remote control pulse according to a selected manufacturer;

an infrared (IR) modulating/sending section that modulates the oscillated remote control pulse to an infrared ray and sending the infrared ray; and a control section that determines whether communication is tried during implementation of a remote control function, terminates the remote control function to implement a communication function when the communication is initiated, determines whether the communication is an outgoing communication, and if the communication is an outgoing communication, switches from the remote control function to a communication function and provides outgoing communication service at the portable terminal, and if the communication is not an outgoing communication, determines whether the communication is an incoming communication, and if the communication is an incoming communication, switches from the remote control function to a communication function and provides incoming communication service at the portable terminal; and performs the remote control function again when the communication ends, wherein the control section determines whether the remote control function has been terminated when the communication ends, returns to the remote control function when the remote control function has not been terminated and terminates the remote control of functions when the remote control function has been terminated.

6. A method for performing remote control of electronic products using a portable terminal, the method comprising the steps of:

performing a remote control of functions of at least one electronic product in a remote control mode by controlling an infrared modulating/sending section to modulate an oscillated remote control pulse to an infrared ray and sending the infrared ray to the electronic products;

when communication is tried during the remote control mode, determining whether the communication is an outgoing communication, and if the communication is an outgoing communication, switching from remote control mode to a communication mode and providing outgoing communication service at the portable terminal, and if the communication is not an outgoing communication, determining whether the communication is an incoming communication, and if the communication is an incoming communication, switching from remote control mode to a communication mode and providing incoming communication service at the portable terminal;

when the communication ends, determining whether the remote control mode has been terminated;

returning to the remote control mode when the remote control mode has not been terminated;

terminating the remote control of functions when the remote control mode has been terminated; and wherein said step of performing a remote control in a remote control mode comprises:

displaying kinds of electronic products controllable by a remote controller on the display;

when at least one kind of the displayed electronic products is selected, displaying the manufacturers of the selected electronic product on the display;

when at least one of the displayed manufacturers is selected, displaying the selected electronic product and manufacturer and setting a remote control mode suitable for said selected electronic product on the display;

performing a remote control function in the remote control mode; and terminating the remote control mode to terminate the remote control function.

* * * * *